United States Patent [19]

Schou

[11] Patent Number: 4,845,831
[45] Date of Patent: Jul. 11, 1989

[54] OPEN CASING, SELF-LOCKING DIFFERENTIAL

[76] Inventor: Carl E. Schou, 1438 Lone Pine Rd., Bloomfield Hills, Mich. 48013

[21] Appl. No.: 112,168

[22] Filed: Oct. 26, 1987

Related U.S. Application Data

[63] Continuation-in-part of Ser. No. 808,630, Dec. 13, 1985, abandoned.

[51] Int. Cl.$^4$ .............................................. B23P 11/00
[52] U.S. Cl. ........................................ 29/434; 29/469; 192/93 A
[58] Field of Search ................... 74/650, 606 R, 711; 29/454, 469; 192/93 A

[56] References Cited

U.S. PATENT DOCUMENTS

| | | | |
|---|---|---|---|
| 1,704,861 | 3/1929 | Lewis | 74/650 |
| 2,397,673 | 4/1946 | Lewis | 74/650 X |
| 2,555,044 | 5/1951 | Lewis | 74/650 |
| 4,400,996 | 8/1983 | Schou | 74/650 |
| 4,498,355 | 2/1985 | Schou | 74/650 |
| 4,507,984 | 4/1985 | Goscenski, Jr. | 74/650 |
| 4,513,633 | 4/1985 | Goscenski, Jr. | 74/650 |
| 4,569,250 | 2/1986 | Nellums | 74/650 |
| 4,640,143 | 2/1987 | Schou | 74/650 |

FOREIGN PATENT DOCUMENTS

| 1330857 | 5/1962 | France | 74/711 |
|---|---|---|---|

*Primary Examiner*—Mark Rosenbaum
*Assistant Examiner*—Frances Chin
*Attorney, Agent, or Firm*—Harness, Dickey & Pierce

[57] ABSTRACT

A differential assembly has a rotatable, open sides casing into which the opposite, splined ends of axial shafts extend. Each axial shaft has a splined collar ring mounted upon it and a surrounding coupling ring. A drive rod, secured to the casing, extends between the opposed coupling rings and has wedge shaped surfaces fitted within aligned V-shaped notches formed on facing surfaces of the coupling rings. Disk plate type clutches releasably connect each of the coupling rings to their adjacent collar rings. The clutches include Belleville spring washer plates which resiliently force the coupling rings inwardly against the drive rod for maintaining the rod wedge shaped surfaces in face to face contact with their adjacent notch walls. The coupling rings, clutches and collar rings are assembled into the casing through its open side and thereafter, the rod is inserted endwise into the casing, between the coupling rings, through a rod receiving hole in the casing. When the casing rotates, the drive rod wedge surfaces drive the coupling rings and also, press them outwardly for connecting the clutch for engaging the coupling rings with the collars to rotate the axles. If either axle rotates faster than the casing, the outward pressure of its rod wedge surface against its coupling ring notch is momentarily relieved and therefore, its clutch is temporarily disconnected so that axle may free wheel until it returns to the casing speed.

10 Claims, 3 Drawing Sheets

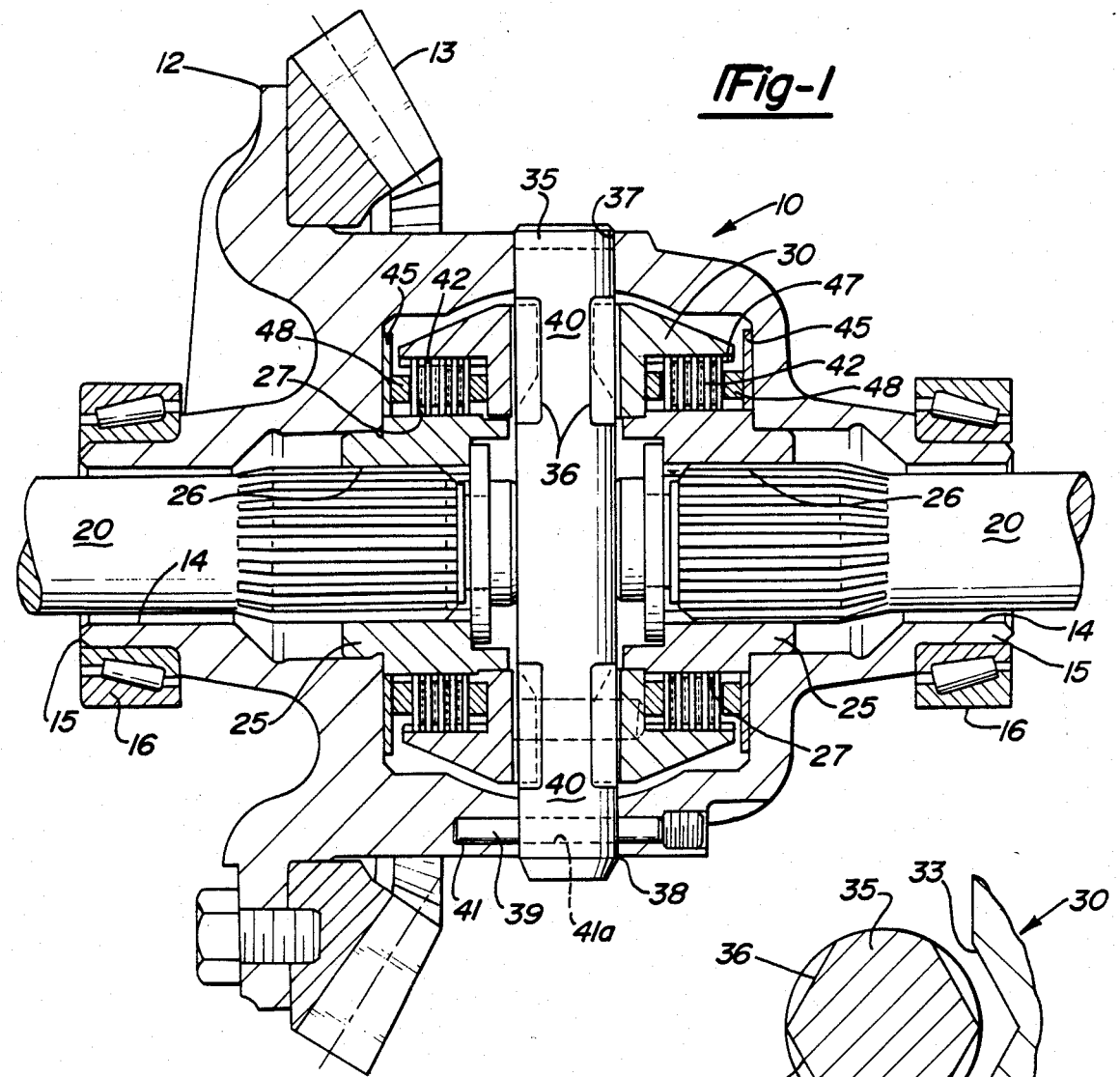
Fig-1
Fig-2
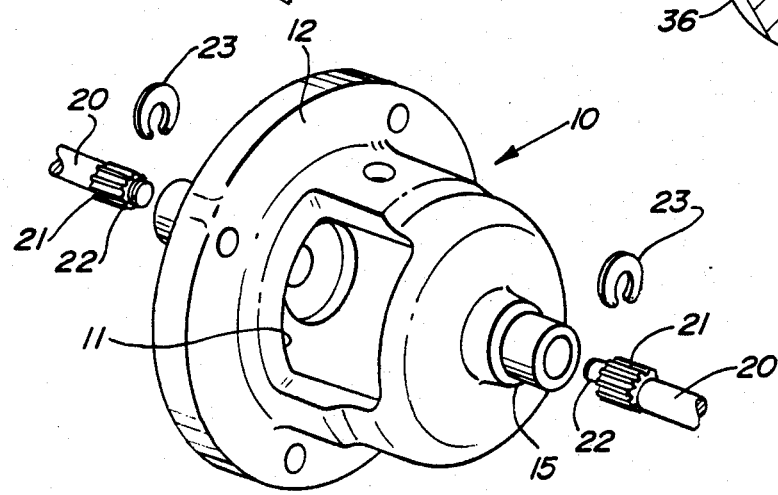
Fig-3

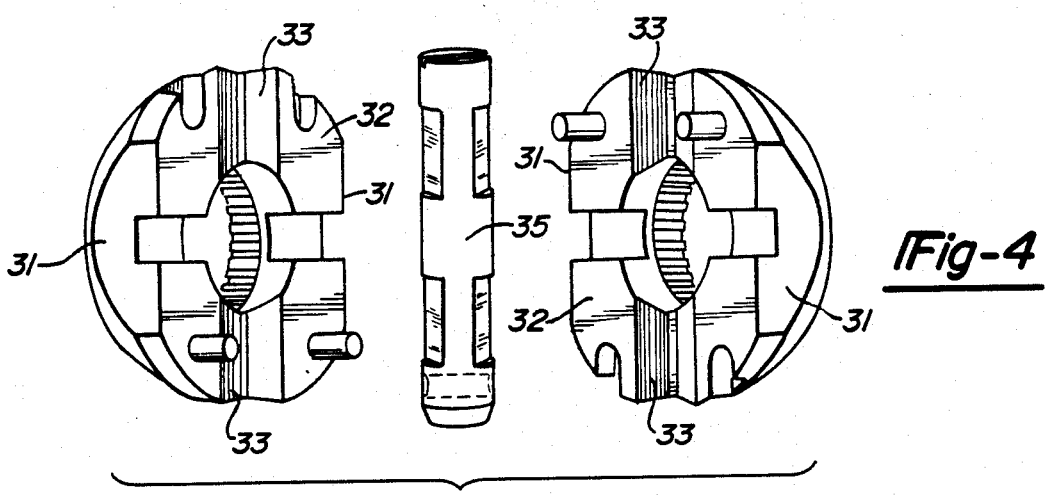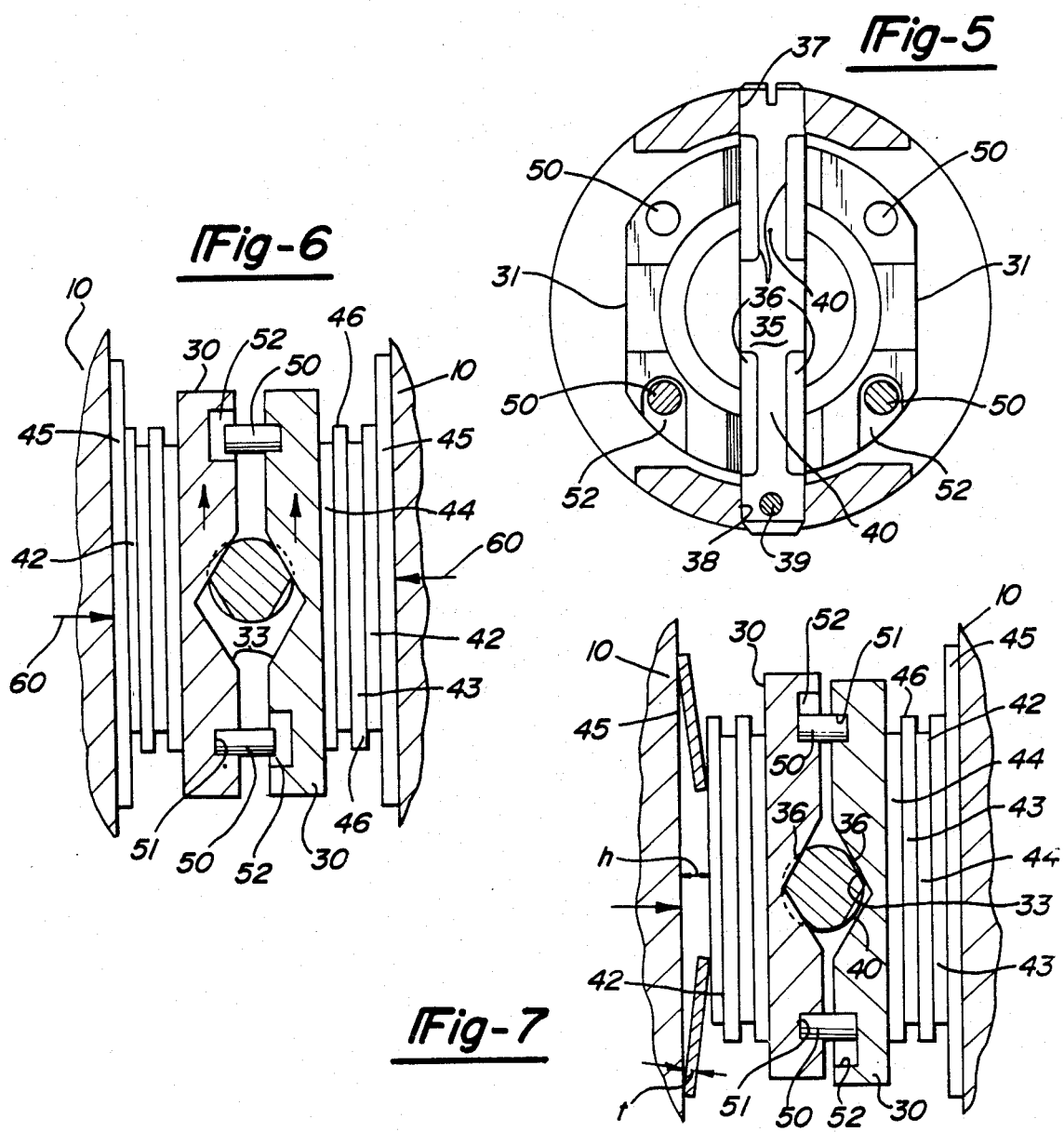

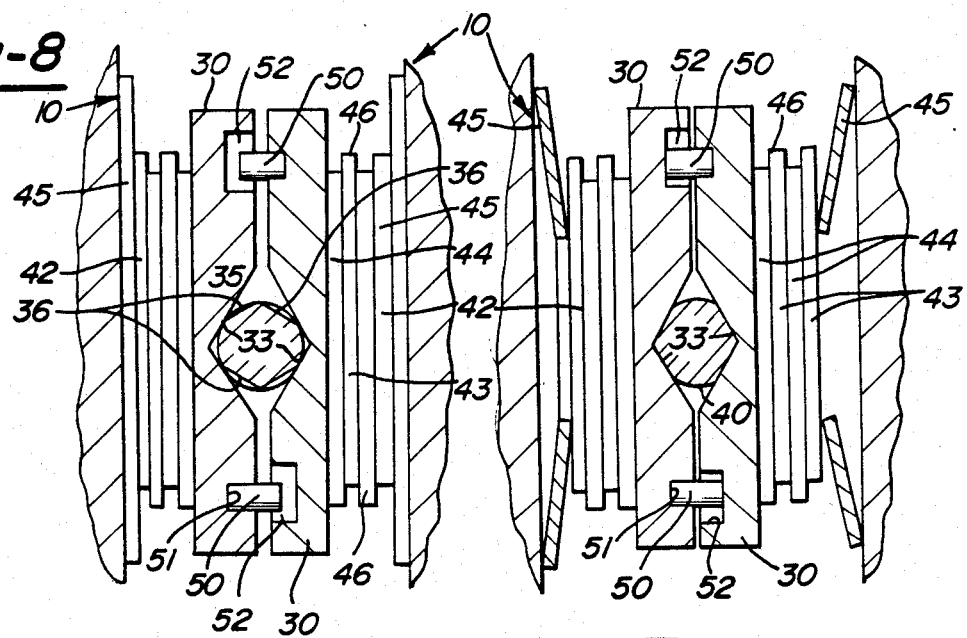
*Fig-8*
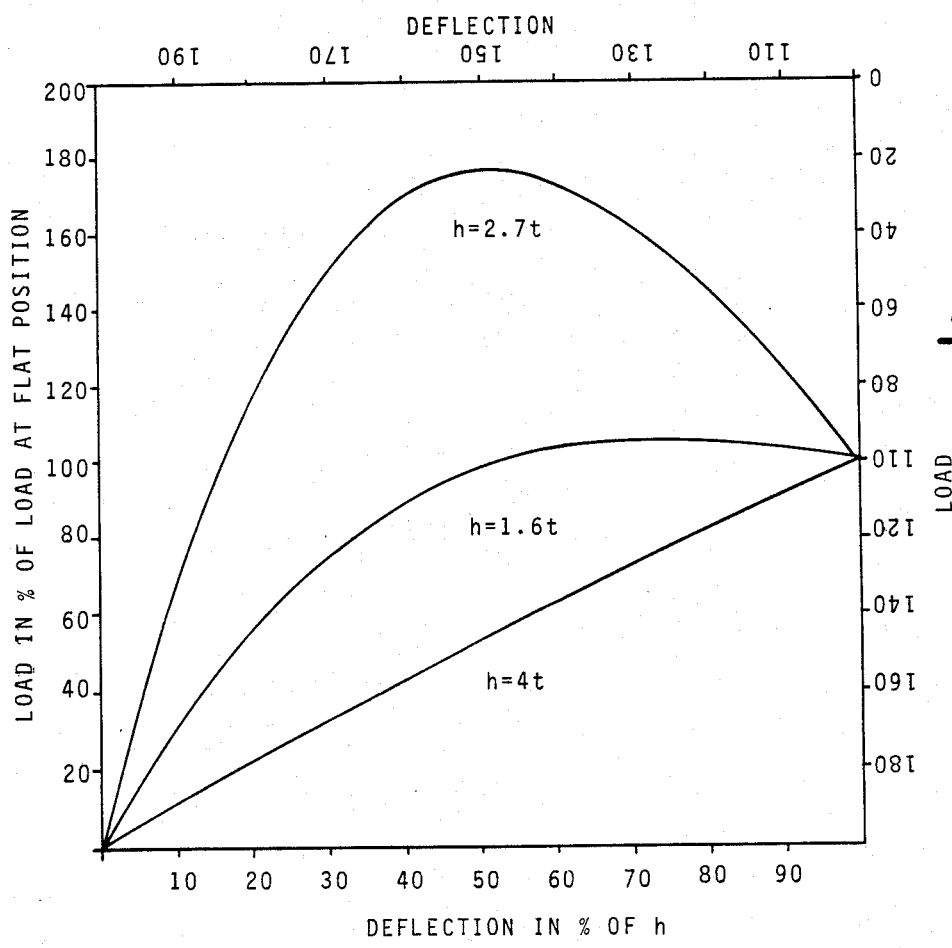
*Fig-9*
*Fig-10*

OPEN CASING, SELF-LOCKING DIFFERENTIAL

This application is a continuation-in-part of Ser. No. 808,630 filed on Dec. 13, 1985, now abandoned.

BACKGROUND OF INVENTION

This invention relates to a self-locking differential assembly of the type disclosed in my prior U.S. Pat. No. 4,498,355 issued Feb. 12, 1985. In that type of differential, which is used on automotive type vehicles, the casing or inner housing receives the opposite ends of the axle shafts and contains a mechanism for normally coupling the shafts to the casing so that as the casing is power rotated, the shafts rotate therewith. However, where either shaft overruns, that is, rotates faster than the casing, the mechanism temporarily disconnects that axle so that it may free wheel while the power is transferred through the opposite axle. Upon returning to casing rotational speed, the free wheeling axle again is reconnected for rotation by the casing.

The mechanism for connecting the axle shaft ends to the casing includes drive members comprising a spider or a pair of drive rods which are fastened, transversely within the casing for rotation therewith and located between the adjacent ends of the axles. These drive members have wedge-shaped formations which engage V-shaped notches formed in adjacent coupling rings that are connected, through clutches, to collars mounted upon the ends of the shafts. In normal drive, the engagement between the wedge shaped formations and the notch walls rotate both coupling plates simultaneously, while forcing them outwardly to connect the clutch for driving the axles. However, in an overrun condition, the overrunning axle's coupling ring advance angularly a small distance relative to the drive rods for disengagement, resulting in simultaneous disengagement of its clutch to produce the free wheeling effect.

The invention of this present application relates to an improvement in such type clutches, namely in the system for assembling the clutch parts; for providing a substantially gapless contact between the drive rod wedge surfaces and the V-shaped notches in the coupling rings for faster response for connecting and disconnecting the clutch and for automatically compensating for wear in the clutches.

SUMMARY OF INVENTION

This invention contemplates the use of an open sided, one piece casing which receives the opposite ends of axle shafts. The mechanism for connecting the shafts to the casing may be assembled into the casing through its open side. More specifically, splined collar rings are mounted on the inner ends of the shaft by inserting them through the side of the casing and these, in turn, are surrounded by coupling rings shaped to fit through the open side of the casing. The coupling rings are releasably connected to the collar rings by means of disk type clutches having at least one disk shaped to provide a constant resilient force which biases the coupling rings together. This latter disk is preferably a Belleville washer.

A single drive rod is inserted transversely of the casing, through holes formed in the casing walls, between the coupling rings. The rod is provided with wedge shaped wall surfaces which engage the walls of open, aligned notches formed in the adjacent faces of the coupling rings. The resilient clutch disks, which are preferably in the form of Belleville or dished washers, maintain the wedge surfaces and the notch walls in constant face to face contact.

Upon normal rotation of the casing in either direction, the drive rod wedge surfaces engage the notch walls for rotating the coupling rings as well as for pressing them outwardly to lock-up the clutch plates and, thereby, the collar rings and the axles for rotation with the casing. However, should either axle overrun the casing, as for example where the wheel of a vehicle on the outside of a turn rotates faster than the wheel on the inside of the turn, its coupling ring momentarily tends to move faster than the drive rod. Consequently, its contacting notch wall and rod surfaces slide to permit the coupling ring to move axially inwardly towards the opposite coupling ring. That is, the rod wedge surfaces move more deeply into the notch of the overrunning coupling ring. This relieves the outward pressure against, and momentarily releases, the clutch on the overrunning axle so that the axle may free wheel until such time as it slows down to the casing speed and the clutch re-engages.

An object of this invention is to form the casing and the differential locking mechanism so that the casing may be formed as a one piece casting and the locking mechanism parts may be inserted into the casing for assembly without having to use a casing made of separable halves. This permits the use of a standard, one-piece casing and permits less expensive assembly work as contrasted with differentials which utilize casings or inner housings that are made of multiple parts that must be assembled around the internal parts and related mechanisms, etc.

Another object of this invention is to provide a locking mechanism wherein the drive rod wedge surfaces and their adjacent coupling ring notch walls are in normal face to face contact at all times to eliminate gaps therebetween and thereby permit faster, virtually instantaneous, connecting and disconnecting of the axles to the casing.

Still another object of this invention is the use of biasing means which facilitate assembly and automatically compensate for wear in the locking mechanism and in particular compensate for wear in the clutch plates.

Still a further object is to form a limiting means for limiting the relative angular movement between the two opposed coupling rings, which limiting means comprise pins that can be engaged easily by manipulating the positions of the coupling rings within the casing. That is, the limiting means can be engaged during the assembly of the parts through an open side of the casing without requiring tools.

These and other objects and advantages of this invention will become apparent upon reading the following description, of which the attached drawings form a part.

DESCRIPTION OF DRAWINGS

FIG. 1 is a cross-sectional view which schematically illustrates the differential assembly.

FIG. 2 is an enlarged, fragmentary end view of the drive rod wedge shape surfaces and an adjacent coupling ring notch.

FIG. 3 is a perspective view, to a smaller scale, showing the open sided casing.

FIG. 4 is a perspective view of the two coupling ring notched faces, between which is the drive rod.

FIG. 5 is an elevational view of one of the two coupling rings with the drive rod in position.

FIG. 6 is a schematic diagram showing the normal operation of the connecting mechanism with both shafts operating at the same speed of rotation, and FIG. 7 is a schematic diagram similar to FIG. 6, but showing an overrun condition by which the faster rotating left axle shaft is free wheeling or uncoupled, while the right axle shaft remains coupled and is driven.

FIG. 8 is a schematic diagram showing the two coupling rings with the drive rod in the assembly position.

FIG. 9 is a schematic diagram showing the two coupling means with the drive rod in the assembled position.

FIG. 10 is a chart showing load-deflection curves for various height to thickness ratios of Belleville-type washers or springs.

DETAILED DESCRIPTION

Referring to FIGS. 1 and 3, the differential assembly includes a hollow casing 10 which may be formed in one piece, as by casting. One or both of its sides 11 are open, as shown in FIG. 3. The casing has an integral, annular flange 12 upon which the conventional bevel gear 13 is fastened, by suitable bolts.

The opposite ends of the casing are provided with axially aligned axle openings 14 which extend through bearing hubs 15 upon which conventional roller bearings 16 are positioned. The inner ends of axle shafts 20 are inserted through the axle openings 14. Each of the shaft inner end portions are provided with a spline 21 and terminate in an end portion having a groove 22 which receives a C-ring fastener 23 for securing the shaft ends within the casing.

Ring-like axle collars 25 surround each of the axle shaft spline end portions. These collars have interior splines 26 which correspond to and interconnect with the splined end portions 21 of the shafts. They also have exterior splines 27.

A pair of coupling rings 30 surround the axle collars. These coupling rings, which are generally round, have flattened sides 31 (see FIG. 4) so that dimensionally they can be fitted through the casing opening 11 and then manipulated into place inside the casing. These coupling rings have inner faces 32 which oppose each other and are provided with aligned V-shaped notches 33. Such notches are made up of angled walls which typically may be arranged at about a 120 degree angle relative to each other or each wall being at about a 60 degree angle relative to the center plane of its notch.

A round drive rod 35 is transversely arranged within the casing, between the coupling rings. The drive rod has wedge shaped surfaces 36 which correspond in angle, length and shape to the walls which define the V-shaped notches in the coupling rings. Such wedge shaped surfaces 36 are normally in surface to surface contact with the notch walls 33.

The drive rod is inserted in the casing through an upper hole 37 for sliding it endwise between the coupling rings until its lower end enters a lower casing hole 38 which forms a socket. The drive rod is pushed longitudinally through the hole 37 with its round surface 40 engaging and spreading apart the coupling rings. After the rod is positioned within the lower hole 38, it is rotated a half turn so as to align its wedge shaped surfaces with the notches. At that point a rod securing pin 39 is slipped into aligned holes 41 and 41a in the casing and rod lower end respectively.

Disk type plate clutches 42 releasably connect the coupling rings to their respective shaft collar rings. These clutches are made up of ring-shaped, flat disks 43 and 44 (see FIGS. 5 and 6) which make up a stack of disks that frictionally lock when the stack of disks are pressed together tightly and release when the pressure is relieved. Preferably the outermost disks 45 are formed in the shape of Belleville washers, that is, washer-like rings that are dish-shaped in cross-section so that they form resilient springs applying pressure in the axial direction.

As is conventional with such types of disk clutches, the external edges of alternative disks or plates are provided with tabs or teeth 46. These tabs interlock with the exterior spline 27 on the collar. The alternate disks have tooth-like tabs which interconnect with an interior spline 47 within the coupling ring. To fill any remaining space at the opposite ends of each of the stack of clutch plates, thick spacer rings 48 may be used as part of, or at the ends of the stack (see FIG. 1).

The amount of relative angular movement between the two coupling rings is controlled by a limiting means comprising two pairs of limit pins 50 secured within holes 51 in the adjacent surfaces of the coupling plate and loosely fitted within open sided sockets 52 in their opposed coupling plates (see FIGS. 4–6). By arranging two pins and two open sided sockets in each of the faces of the coupling rings, the pins in one coupling ring can be slidably fitted within the sockets of the other by manipulating the two coupling rings manually within the interior of the hollow casing. The degree of looseness of the pins within the respective sockets controls the amount of relative angular motion between the adjacent coupling rings.

The present invention uses Belleville washers or springs 45 to bias or press the stack of disks 43 and 44 together. Belleville washers 45 are used because they do not function according to Hook's law on which typical spring design is founded. Hook's law states that within the proportional limit of any material, deflection is directly proportional to load. Therefore, according to Hook's law, when deflection is increased the load is proportionally increased. This is not true of Belleville washers. It has been determined that if the ratio of height (h) to thickness (t) of a Belleville washer is greater than 1.41, the load reaches a peak between 0 and 100% deflection and then decreases with further deflection of the washer. With reference to FIG. 7, the height (h) and thickness (t) of the Belleville washer 45 are shown. The deflection-load formula for a typical Belleville washer is:

$$P = \frac{Ef}{(1 - \sigma^2) Ma^2} [(h - f/2)(h - f)t + t^3]$$

$P$ = Load in pounds
$f$ = Deflection in inches
$t$ = Thickness of material in inches
$h$ = Free height minus thickness in inches
$a$ = 1/2 outside diameter in inches
$E$ = Young's modulus
$r$ = ratio of $\frac{O.D.}{I.D.}$
$\sigma$ = Poisson's ratio = 0.3 for steel $$M = \frac{6}{\pi \log_e r} \frac{(r - 1)^2}{r^2}$$

The chart of FIG. 10 shows the load at any deflection of the washer when the height and load at flat position are known. The series of curved lines represent the characteristic load-deflection curves for each ratio of height to thickness. All of the lines start out at the lower left-hand corner of the chart at zero deflection and zero load and converge at the middle of the right-hand side at the point which represents 100% of available deflection and 100% of load. The load shown at the left, and the deflection shown at the bottom of the chart, are expressed as percentages of the load and deflection required to flatten the washer. The inverted figures at the right and top of the chart are for deflections beyond the horizontal position or flattened position.

It should be apparent from the chart that as the ratio of height to thickness decreases, the load-deflection curve approaches a straight line. With a ratio of h=0.4t, the maximum error caused by assuming a straight-line load-deflection curve would be about 2.5%. If the ratio of height to thickness is greater than 1.41, the load reaches a peak and then decreases with further deflection, as for example at h=1.6t and h=2.7t.

To illustrate the use of the chart, consider a washer which is dished 1.6 times its thickness and which has a calculated load of 100 pounds at the flat position. At 75% of its deflection, the load will be approximately 105% of the flat load, or 105 pounds; at 50% deflection, the load will be approximately 95% or 95 pounds; at 25%, the load will be approximately 66% or 66 pounds. Therefore, it is possible to obtain definite load deflection characteristics which are desired in this type of washer by changing the (h/t) ratio.

In the preferred embodiment of this invention, the height to thickness ratio is approximately 1.6. With reference to FIG. 10, the same load is obtained at 53% of deflection and at 100% of deflection. Between these two deflection points, the load of the washer is greater. This characteristic of Belleville washers having a height to thickness ratio of greater than 1.41 provides two advantages, when used in a differential, automatic load compensation as the clutches wear and easier assembly of the differential.

Load compensation for clutch wear is obtained by selecting the stack of clutch disks 43 and 44 such that during operation of the differential the Belleville washers will deflect at least approximately 53% of deflection up to 100% of deflection. Further, the stack of disks 43 and 44 are selected such that they are biased or pressed together to apply the clutches and drive the axles at a load approximately equal to the load of the washer at its flattened position. If the deflection is predetermined to be greater than 72% but less than 100%, the initial load upon the assembly is less than the peak load but clearly greater than the load at flat load which is enough to insure frictional locking of the clutches. As the clutches wear, the deflection on the Belleville washers decreases which simultaneously increases the load as it approaches the peak load to compensate for clutch wear and to continue to give the desired frictional locking of the clutches. The desired load will be available until the wear allows the deflection to fall below approximately 53%.

The Belleville washers further facilitate assembly. The differential is assembled by first making sub-assemblies of the disk clutches containing the coupling rings and disks and then, one at a time, inserting these sub-assemblies through the open sides of the case to locate the clutches in their proper location. Thereafter, the drive rod is slipped endwise through the rod receiving hole 37 to force the couplings apart and for positioning the rod between the rings. The rod is inserted with the rounded portions 40 engaging the V-notches 33. The rounded portions 40 on rod 35 deflect the washers 45 to approximately 100% of deflection which reduces the load from the washers below peak load. See FIG. 8. In contrast, if a typical coil spring was used, the insertion of the drive rod 35 would be opposed by the full load of the compressed spring. This is due to the coil spring following the principle of Hooke's law which states that deflection is directly proportional to load. If the load deflection curve of the coil spring were charted on the chart of FIG. 10, it would be a straight line much like the curve of a Belleville washer at or below a ratio of 0.4. This is not encountered with Belleville washers having a height to thickness ratio of greater than 0.4.

In addition, the rounded portion of the rod does not interfere with the V-notches 33 as it is being inserted. The rounded rod provides a smooth surface which does not catch on the coupling ring as it is inserted.

After complete insertion, the rod is rotated approximately 90° to align the wedge-shaped surfaces with the V-shaped notches. See FIG. 9. In this position, the coupling rings 30 are forced inwardly such that the notches 33 and wedge-shaped surfaces 32 are in contact. If rod 35 is properly positioned, the coupling rings will audibly snap into position which alerts the assembler that proper assembly has been achieved. When assembled, the deflection of the Belleville washers 45 is relieved as shown in FIG. 9 to a deflection of approximately 20% of free-height as defined in FIG. 10. This relieved deflection maintains the engagement of surfaces 32 in notches 33 by applying an outward pressure to rings 30. In this way, the drive rod 35 is in constant engagement with the coupling rings 30 to provide instantaneous coupling and uncoupling of the differential when required while reducing if not eliminating actuation noises. After rotation, the rod is then pinned in place and the unit is completely assembled and ready for the axle shafts to be installed.

During operation, the casing is rotated by the conventional power means which drives the bevel gear and therefore, the axles inserted within the casing. Referring to FIG. 6, which diagrammatically shows the operation under normal conditions, the wedge shaped surfaces 36 of the drive rod engage the leading walls of the aligned V-shaped notches 33 for rotating the coupling rings while simultaneously applying an outward pressure upon the rings. This outward pressure, in turn, applies against the clutches, which are schematically illustrated as disks or plates. Meanwhile, the outermost springy Belleville or dished washers, are flattened and, therefore, they apply inward spring pressure against their respective coupling disks, as illustrated by the arrows 60. In this condition, the limit pins 50 are roughly centered within their sockets 52. Both axles are driven at the same rotational speed as the casing. As illustrated, the Belleville washers are shown completely flattened. In the preferred embodiment, the Belleville washers are not completely flattened but only approach 100% deflection.

Where either of the axles overrun the casing rotational speed, as for example, where an axle is connected to a wheel located on the outer part of a curve so that it rotates faster than the inner wheel on the curve, its clutch coupling disconnects so that the faster running axle and its wheel freely rotate. The other axle remains coupled and consequently, is still driven by the rotating casing. FIG. 7 schematically or diagrammatically illustrates a condition where the left axle overruns the casing, i.e., it rotates faster than the right axle.

In FIG. 7, the faster rotating, left coupling ring 30 advances angularly (i.e., upwards in the drawing) until the pins 50 engage the lead walls of their sockets 52. Because of the Belleville spring pressure, the notch wall slides upon the adjacent contacting wedge surface of the rod so that the rod wedge surface enters more deeply into the notch. Consequently, the coupling ring moves axially inwardly towards the opposite coupling ring, closing the space between them. The relative angular motion of the coupling rings is limited by the engagement between pins and socket walls.

At this point, the outward pressure of the overrunning coupling ring against the clutch plates is relieved and the plates are sufficiently loose so as to disengage the previously tight frictional interlock of the clutch plates to uncouple the clutch. This is exaggerated in FIG. 7 which shows the Belleville washer as highly dished or bowed. Actually, the pressure is relieved sufficiently so that it dishes very slightly enough to still apply slight pressure, but not enough to frictionally lock the clutch plates. This disconnects the collar ring from that coupling ring and permits the shaft to free wheel.

The condition which is schematically illustrated in FIG. 7, continues until such time as the overrunning axle slows down to the rotational speed of the casing. When that occurs, there is a momentary angular shift of its coupling ring and the condition shown in FIG. 5 is re-established. The wedge surfaces of the drive rod and the walls of the notches remain in contact, during the uncoupled condition, so that there are virtually instantaneous responses to the change in rotational speed of the axle shafts relative to the casing. This permits faster transfer of power from the free wheeling axle to the other axle which now handles 100% of the power during the free wheel time. In addition, it avoids any clicking sounds or noises which might possibly occur during the engagement and disengagement of the drive rod and notch surfaces if they were gapped apart.

Having fully described an operative embodiment of this invention, I now claim:

1. In a differential assembly having a pair of axially aligned shafts having their adjacent inner end portions extending inwardly into a hollow casing which is rotated about an axis aligned with the shaft axes, means for releasably connecting the shaft inner end portions to the casing for thereby rotating the shafts, said means comprising:

a drive rod arranged between the shaft inner end portions and extending transversely of the casing and its axis of rotation, with the rod being fixedly secured to the casing;

a coupling ring surrounding each shaft end portion and each ring having an inner surface formed with a pair of diametrically aligned V-shaped notches with the notches in one ring opening towards and being aligned with the notches in the other ring, and with the rod having wedge shaped surface portions corresponding to the shapes of the walls forming the notches which are fitted within and extended through the aligned notches and are in face to face contact with their adjacent notch walls;

said casing being of a one piece construction and having an enlarged central opening along at least one side which is generally parallel to its axis of rotation, with said opening being of sufficient size to permit fitting of the coupling rings there through for assembling such coupling rings and their clutches upon the end portions of the shafts, and diametrically opposed holes formed in the casing transversely of its axis of rotation and through which openings the rod may be endwise slid for positioning the rod within the casing between the coupling rings, with the opposite end portions of the rod each held within its respective adjacent hole, and fastener means locking the rod against removal from the hole;

clutches connecting the shaft end portions to their respective coupling rings, and said clutches being of the type which engage upon the application of outwardly directed axial pressure and disengage upon relief of said pressure, and said clutches including means for resiliently biasing the coupling ring notch walls inwardly against their respective rod surfaces so that the rod surfaces and their adjacent notch walls are normally maintained in face to face contact at substantially all times;

said resilient biasing means having a biasing force which varies according to the deflection of said biasing means such that said biasing force increases with increasing deflection to a peak force and then decreases with continued increasing deflection;

said rod being configured to deflect said biasing means beyond said peak force such that said biasing force is decreased during insertion of said drive rod to facilitate installation and upon rotation of the said drive rod said wedge-shaped surface portions of said drive rod being fitted within said V-shaped notches in said coupling rings;

wherein normal rotation of the casing causes the rod wedge shaped surface portions to exert outwardly directed pressure upon their adjacent coupling ring V-shaped notch walls to thereby apply an outwardly directed pressure upon the clutches to engage them for connecting the coupling rings to the shaft end portions and rotating the shafts with the casing, but wherein when either of the shafts rotate faster than the rotational speed of the casing, thereby causing faster movement of its coupling ring notch wall surface than the rod wedge surface, the pressure between such notch wall surface and its rod wedge surface is sufficiently relieved so that the coupling ring notch wall surface slides inwardly upon the rod wedge surface and thus, such coupling ring shifts axially inwardly of the casing to relieve its outwardly directed clutch pressure resulting in temporarily disconnecting the shaft end portion from such coupling ring so that such shaft may free wheel until its rotational speed again equals that of the casing, at which point the rod wedge surface again applies pressure against the notch wall surface and causes it to slide outwardly, to thereby move the coupling plate outwardly for reconnecting its clutch;

said outwardly directed pressure deflecting said biasing means beyond said peak force with wear upon said clutches being compensated by the relief of said deflection which simultaneously increases said biasing force;

and means for limiting relative angular movement of one of the coupling plates relative to the other so as to normally maintain the rod wedge surfaces generally centered within the notches.

2. A differential as defined in claim 1, and said coupling rings being narrower in their diametric dimension which is transverse to their aligned V-shaped notches, so that they may be inserted through the casing opening into the casing.

3. A differential as defined in claim 2, and said clutches each comprising a stack of annular washer-like disks arranged within their coupling rings for face to face contact, with alternate plates having radially outwardly extending tabs connecting them to their adjacent interior wall of the coupling ring, and the other alternate plates having means connecting them to their adjacent shaft end portions;

with one end of each of the stack of plates engaging an adjacent portion of the interior of the casing and the opposite ends of such stacks engaging an adjacent interior surface of the coupling plate which is transverse to the axis of rotation of the casing for squeezing the plates together between the casing interior portion and the coupling interior surface.

4. A differential as defined in claim 3, and one of the clutch plates of each clutch being dished in cross-section to function as springs for normally resiliently biasing the coupling plates inwardly towards the rod.

5. A construction as defined in claim 4, and said means for limiting the relative angular movement of the coupling rings comprising at least one pin having an end secured to one of the coupling plates and extending in an axial direction into a socket formed in the opposite coupling ring, with the socket also opening transversely at a side of its coupling ring so that the pin may be inserted therein by moving it transversely of the casing axis, and said pin being relatively loose in the socket with the amount of looseness corresponding to a predetermined, permissible small angular movement of one ring relative to the other.

6. A construction as defined in claim 3, and including a circular, ring-like collar arranged upon each of the end portions of the shafts within the housing and held against endwise movement from the housing, with the shaft end portions having external splines engaged with corresponding teeth formed on the internal wall of the respective collar so that the shafts and their collars rotate together, but the shafts may be moved endwise out of their collars and out of the casing;

and means connecting said other alternative plates to the shaft including a spline formed upon the exterior surface of each collar engaging with teeth-like tabs formed on said other alternative plates.

7. A method for assembling a differential having a casing provided with axially aligned opening for receipt of opposed axles; the method comprising the steps of:

(1) providing at least one opening in the side of said casing;
(2) assembling a pair of clutch packages with each of said clutch packages including a coupling ring having an annular flange on one face and aligned V-shaped notches on the opposite face, an axle collar having an inner surface configured to engage an axle and an outer surface surrounded by said annular flange and a plurality of clutch plates interposed between said outer surface of said axle collar and said annular flange for selectively interconnecting said collar and said rings;
(3) positioning a biasing means about each of said axle collars opposite said coupling rings; said biasing means having a biasing force which varies according to the deflection of said biasing means such that said biasing force increases with increasing deflection to a peak force and then decreases with continued increasing deflection;
(4) inserting each of said clutch packages into at least one opening such that said V-shaped notches are facing one another and parallel with respect to one another;
(5) providing receiving holes on opposite sides of said casing for receipt of a cylindrical drive rod, said drive rod having wedge-shaped surfaces which correspond in angle, shape, and length to said V-shaped notches;
(6) inserting said drive rod into said receiving holes with said wedge-shaped surfaces out of alignment with said notches such that said cylindrical drive rod forces said coupling ring and clutch plates against said biasing means deflecting said biasing means past said peak force to reduce opposition to facilitate the insertion of said drive rod.

8. The method of claim 7, further comprising the step of:

inserting an axle into each of said axially aligned openings and into said axle collar such that said axle collar is mounted to the end of said axle;
rotating said drive rod such that said wedged surfaces and said notches are engaged and said deflection of said biasing means relieved.

9. The method of claim 8, further comprising the step of:

positioning a retaining means about the end of each axle to retain said axle collar on said axle and said axle within said casing.

10. The method of claim 7, further comprising the step of:

securing the drive rod to said casing after rotation of said drive rod is complete.

* * * * *